Patented Oct. 13, 1925.

1,556,854

UNITED STATES PATENT OFFICE.

ADOLPH W. H. LENDERS AND JOHN M. WIDMER, OF CEDAR RAPIDS, IOWA, ASSIGNORS TO PENICK & FORD LTD. INCORPORATED, OF CEDAR RAPIDS, IOWA, A CORPORATION OF DELAWARE.

MANUFACTURE OF GRAPE SUGAR.

No Drawing.     Application filed May 23, 1923.   Serial No. 641,020.

*To all whom it may concern:*

Be it known that we, ADOLPH W. H. LENDERS and JOHN M. WIDMER, citizens of the United States and Switzerland, respectively, residing at Cedar Rapids, in the county of Linn and State of Iowa, have invented certain new and useful Improvements in the Manufacture of Grape Sugar, of which the following is a specification.

Our invention relates to a method of manufacturing grape sugar, and particularly a grape sugar, preferably white, of high purity and in a solid, dry state, capable of being reduced to a powder or otherwise comminuted; and the primary object of the invention is to provide an improved and economical method for the production of a solid, pulverizable and stable grape sugar by the conversion of starch, more especially corn starch, in accordance with which method all of the converted liquor, after elimination of certain residual impurities, mostly of an albuminous character, may be solidified, dried and reduced to a pulverulent state. That is to say, no mother liquor remains as a by-product as is the case with the methods in commercial use at the present time for manufacturing corn sugars having high dextrose contents. The desired result is attained by a certain novel mode of treatment of the converted liquor for the removal of protein impurities, which treatment, through the complete or substantially complete elimination of such impurities, makes possible the manufacture at a low cost and by methods which are simple and conveniently practiced of a corn sugar that is white, can be dried and pulverized, and will remain in a dry, pulverulent condition under ordinary atmospheric conditions. The method does not aim, primarily, at the production of a saccaharine product consisting wholly of dextrose. With the method as we prefer to practice it, the product will contain a rather small percentage of partially converted starch which may be characterized as dextrines, but the treatment of the converted liquor is such that this dextrine does not prevent the reduction of the product to a dry, nondeliquescent powder, nor, for most commercial purposes at least, is the presence of the dextrine in the sugar in any way a detriment.

Corn starch manufactured by any of the methods now employed in the industry contains a certain amount of protein impurities, soluble or insoluble. The insolubles may be reduced to a minimum by a carefully controlled tabling operation, followed by a retabling if necessary, and the solubles may be very largely removed by washing the starch, as for example by filter pressing the starch after it has been tabled. But the proteins cannot be entirely eliminated by any known mechanical means. It is hardly practicable, in fact, by mechanical means to reduce the protein content below .3%, calculated on the basis of solid substances. When the starch containing even this low percentage of protein is converted the hydrolyzing acid reacts with the protein matter producing certain albuminous compounds, and these albuminoids, and other impurities, affect the character and quality of the sugar liquor giving it a brownish discoloration and preventing a certain amount of the dextrose from solidifying. The extent to which the residual protein in the starch is affected by the acid is dependent upon the pressure or temperature at which the conversion takes place and the length of time that the acid is in contact with the material. The further one carries the process of conversion the more complete will be the splitting up of the protein, with the result that the impurities become more and more difficult to eliminate, at least without sacrificing some of the dextrose in the form of mother liquor or "hydrol." Contact of the acid with the protein at a temperature or at a pressure high enough and for a period of time long enough to obtain a product having a high percentage of dextrose will result in reducing quite a considerable part of the residual protein to the amino acid stage where its elimination from the converted liquor is practically impossible except by a centrifuging or filter pressing of the partially crystallized material to separate the crystals from the mother liquor, and when this method of procedure is followed the uncrystallized dextrose contained in the expressed mother liquor involves an economical waste since the hydrol is of little commercial value. That is to say, according to the common method of manufacturing a high purity corn sugar the starch is first converted to the fullest extent possible. The converted liquor is then poured into molds where it solidifies to a greater or less extent. The resultant sugar cakes contain a considerable amount of uncrystallizable dextrose, that is, dextrose kept from crystallization by the albuminoid impurities and this mother liquor is then separated from the crystalline dextrose by pressing or centrifuging so that at best the yield of a commercial product is considerably less, pound for pound, than the starch which goes into the process.

If the conversion is only partial, and is carried, for example, only to the glucose stage (40% to 45% reducing sugars calculated as dextrose on the basis of dry substances) and particularly if a starch is used in which the residual protein soluble and insoluble is reduced as far as possible by efficient mechanical separation, the effect of the acid upon the protein will be comparatively slight and the albuminoid substances as modified by the acid may be readily removed by suitable treatment. At this stage, in fact, it is possible to eliminate practically all of the albuminoids, and our invention takes advantage of this circumstance and by arresting the conversion of the starch at an intermediate stage, so to speak, preferably at the glucose stage as defined above, and removing the protein impurities at this stage and thereafter continuing the conversion, makes it possible to produce a converted liquor of high purity, the whole body of which when evaporated can be solidified, dried and pulverized and which will remain dry under ordinary atmospheric conditions. The excess moisture in the cake may be driven off, to the extent necessary, by a properly conducted drying operation. The resultant product is a dry, pulverizable sugar which is non-deliquescent and perfectly white in color. No mother liquor is extracted from the cake. Consequently this source of waste is avoided and one of the rather expensive steps of the usual method of making high purity corn sugars is eliminated.

Assuming that the sugar is manufactured by a continuous series of steps from corn starch as a raw material, the starch after being tabled is washed, in filter presses for example, to remove as much as possible of the soluble proteins. The tabling and washing of the starch is preferably conducted so as to eliminate from the starch all but .3% to .35% of the proteins calculated on the basis of dry substances. The starch is then mixed with water and acid in the customary proportions and is partially converted, for example, to approximately the glucose stage as defined above. The partially converted liquor is neutralized preferably with sodium carbonate, if hydrochloric acid is used as a hydrolyzing agent, and with calcium carbonate if sulphuric acid is employed for conversion. It is then filtered to remove the insoluble proteins which have been rendered capable of being removed in this way by the precedent treatments with the acid and neutralizing agent and is preferably treated with an adsorption agent such as vegetable carbon, bone black or silica jell. After the filtering operation and before the adsorption treatment the liquor is preferably treated with tannic acid to coagulate and precipitate the albuminoids made soluble by the hydrolyzing acid. The tannic acid is introduced into the liquor while the liquor is still hot, or, if need be, the liquor is reheated, and the amount will depend upon the quantity and character of the albuminoid impurities. Ordinarily about four pounds of the so-called technical grade of tannic acid is used for each 100,000 pounds of starch converted, computed on the basis of dry substances. The treatment with carbon which follows absorbs the excess of tannic acid as well as removing the remaining insoluble albuminoids. Another preferred but not essential expedient consists in the treatment of the material handled with phosphoric acid or its salts. Sodium or calcium phosphate (according to whether the hydrolyzing agent is hydrochloric acid or sulphuric acid) is introduced into the converter with the starch and hydrolyzing acid and is reacted upon by the latter to form phosphoric acid. A part but not all of the phosphoric acid is neutralized at the time the hydrolyzing acid is neutralized. The resultant phosphates react with such soluble iron salts as the liquor may contain and the iron is precipitated as iron phosphate. The phosphoric acid, which is not neutralized and the acid phosphates serve to protect the organic substances (dextrose and dextrines) against alkaline reactions during neutralization, and consequently permit the complete or substantially complete neutralization of the hydrolyzing acid. This facilitates the salting out of the insoluble and colloidal proteins taking place during neutralization, and by making possible the complete neutralization of the strong hydrolyzing acid, without detriment to the organic substances, insures the effective action of the tannic acid on the insoluble proteins.

When the partially converted liquor has been purified of its protein in this manner, or by any other suitable means, it is acidified to the proper extent for a solid grape sugar conversion and is returned to the converter and the conversion of the dextrines continued until the percentage of dextrose (reducing sugars) is as high as desired. For example, the purified glucose may be converted until it will show a content of from 93% to 97% reducing sugars expressed as dextrose and calculated on the basis of dry substances.

The sugar liquor is then neutralized in the usual way and may be treated with a small amount of carbon or passed through bone char filters to remove any traces of discoloration. It is then evaporated and, preferably, after being seeded, is poured into molds.

In two hours time or less, the cakes will be hard enough to remove from the molds. This in itself is a feature of some practical importance since with the ordinary processes of making grape sugar the hardening and curing of the cakes consumes a considerably longer period of time. The sugar is a hydrated product. An anhydrous sugar or partially anhydrous sugar might be made by heating the evaporated sugar liquor to a temperature above 122° Fahrenheit. We regard it as more desirable to allow solidification under conditions that will produce a hydrated product because, in such case, the whole mass will set to a harder cake. The cakes are then comminuted in any suitable manner. Preferably the cakes are shaved into very thin slices or flakes preferably of a thickness of about 1/64 of an inch, and the material thus comminuted is dried in kilns or rotary driers in which the temperature is kept at a relatively low point, preferably between 120° and 125° Fahrenheit. The cakes can be shaved immediately after being taken from the molds, that is, within two hours or less from the time that the liquor is poured. The economy in floor space and apparatus resulting from this feature of our process will be readily understood.

When the sugar is treated in this way the moisture will be eliminated from it without danger of the sugar melting. In fact, some of the water of crystallization is ordinarily eliminated as well as the free moisture in the cake and this is advantageous because it gives a harder product and raises its melting point. The dried flakes are run through rollers or other means of disintegration and crushed or reduced to a powder or other comminuted state.

It will be understood that while the improved method has been described as it is preferably practiced, the invention is not to be considered as limited to the particular proportions, temperatures or other details of manufacture which necessarily vary in different manufactories.

The use of phosphates in this connection is of special value where vegetable carbon is used for purification purposes, since the vegetable carbon does not contain any phosphates as does bone black or animal charcoal. The process is preferably carried out so that the liquor contains throughout an excess of phosphates. As a result the tendency of the liquor to pick up iron from the apparatus through which it passes is counteracted.

We claim:

1. Improvement in the method of manufacturing from starch a solid grape sugar, which consists in converting the starch in suspension in water, and neutralizing the converted liquor and removing protein impurities therefrom after conversion has been commenced but before it has been completed.

2. Improvement in the method of manufacturing a solid, dry grape sugar from starch which comprises: partially converting the starch in suspension in water; neutralizing the partially converted liquor and removing the albuminoid impurities therefrom; and thereafter completing the conversion of the starch.

3. Improvement in the method of manufacturing grape sugar which consists in producing a cake of the converted product containing substantially no protein impurities, shaving the cake into thin flakes, and drying the flakes at a temperature low enough not to melt the sugar.

4. Improved method of manufacturing grape sugar from starch of at least ordinary commercial purity which comprises: a partial conversion of the starch by acid hydrolysis to substantially the glucose stage; neutralization of the partially converted liquor and removal of insoluble protein matter; coagulation of the solid albuminoids with tannic acid and their elimination; and completion of the conversion of the purified liquor to a high dextrose content.

5. Method of converting starch into dextrose which comprises removing from the starch substantially all of the soluble protein; converting the starch by acid hydrolysis to the extent that some of the same is changed to dextrose; neutralizing the liquor and filtering the same to remove insoluble protein, coagulating the soluble albuminoids and removing the same by filtration; and thereafter completing the conversion.

6. Method of converting starch into dextrose which comprises removing from the starch substantially all of the soluble protein; converting the starch by acid hydrolysis to the extent that some of the same is changed to dextrose; neutralizing the liquor and filtering the same to remove insoluble protein, coagulating the soluble albuminoids and subjecting the liquor to an adsorption filtration and thereafter completing the conversion.

7. Method of converting starch into dextrose which comprises removing from the starch substantially all of the soluble protein; converting the starch by acid hydrolysis to substantially the glucose stage; neutralizing the liquor and filtering the same to remove insoluble protein, coagulating the soluble albuminoids and removing the same by filtration; and thereafter completing the conversion.

8. Method of converting starch into dextrose which comprises removing from the starch substantially all of the soluble protein; converting the starch by acid hydrolysis to substantially the glucose stage; neutralizing the liquor and filtering the same to remove insoluble protein, coagulating the soluble albuminoids and subjecting the liquor to an adsorption filtration and thereafter completing the conversion.

9. Method of converting starch into dextrose which comprises purifying the starch of substantially all of its soluble protein impurities and reducing the insoluble proteins to substantially not in excess of .35% (based on dry substances); converting the starch by acid hydrolysis to substantially the glucose stage; neutralizing the liquor and filtering the same to remove insoluble proteins; coagulating the soluble albuminoids and removing the same by filtration; and thereafter completing the conversion.

10. Method of converting starch into dextrose which comprises purifying the starch of substantially all of its soluble protein impurities and reducing the insoluble proteins to substantially not in excess of .35% (based on dry substances); converting the starch by acid hydrolysis to substantially the glucose stage; neutralizing the liquor and filtering the same to remove insoluble proteins; coagulating the soluble albuminoids and subjecting the liquor to an adsorption filtration; and thereafter completing the conversion.

11. Method of converting starch into dextrose which consists in reducing the content of insoluble protein in the starch so that it is not substantially in excess of .35% (based on dry substances) and removing substantially all of the soluble protein; converting the starch by acid hydrolysis to substantially the glucose stage; neutralizing the liquor and filtering the same to remove insoluble and colloidal protein matter; treating the liquor with tannic acid to coagulate the albuminoids made soluble by the converting acid; subjecting the liquor to an adsorption filtration; converting the purified liquor to a dextrose content of more than 90%, neutralizing the converted liquor and bringing about the solidification and crystallization of the entire body of converted liquor.

12. Method of converting starch into dextrose which consists in reducing the content of insoluble protein in the starch so that it is not substantially in excess of .35% (based on dry substances) and removing substantially all of the soluble protein; converting the starch by acid hydrolysis to substantially the glucose stage; neutralizing the liquor in the presence of phosphoric acid and filtering the same to remove insoluble and colloidal protein matter; treating the liquor with tannic acid to coagulate the albuminoids made soluble by the converting acid, subjecting the liquor to an adsorption filtration; converting the purified liquor to a dextrose content of more than 90%, neutralizing the converted liquor and bringing about the solidification and crystallization of the entire body of converted liquor.

13. Improvement in the method of converting starch into dextrose which comprises subjecting the starch to a partial conversion, neutralizing the partially converted liquor to eliminate protein impurities, and completing the conversion.

14. Improvement in the method of converting starch into dextrose which comprises subjecting the starch to a partial conversion, neutralizing the partially converted liquor, treating the same with a coagulating agent, and filtering to remove protein impurities.

ADOLPH W. H. LENDERS.
JOHN M. WIDMER.